(12) United States Patent
Kwak et al.

(10) Patent No.: US 7,565,530 B2
(45) Date of Patent: Jul. 21, 2009

(54) SOURCE DEVICE AND METHOD FOR CONTROLLING OUTPUT TO SINK DEVICE ACCORDING TO EACH CONTENT

(75) Inventors: Ki-won Kwak, Seoul (KR); Chun-un Kang, Seoul (KR); Hee-min Kwon, Seoul (KR); Min-woo Jung, Seoul (KR); Chang-nam Chu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 11/100,384

(22) Filed: Apr. 7, 2005

(65) Prior Publication Data

US 2005/0228995 A1 Oct. 13, 2005

(30) Foreign Application Priority Data

Apr. 7, 2004 (KR) .................. 10-2004-0023774

(51) Int. Cl.
*H04L 9/00* (2006.01)
(52) U.S. Cl. .................. 713/156; 713/155; 713/150
(58) Field of Classification Search .................. 713/156, 713/155, 150
See application file for complete search history.

(56) References Cited

FOREIGN PATENT DOCUMENTS

| JP | 2001-175230 A | 6/2001 |
|----|---------------|--------|
| JP | 2001-356752 A | 12/2001 |
| JP | 2003-122636 A | 4/2003 |
| KR | 2002-0027114 A | 4/2002 |
| KR | 2002-29657 A | 4/2002 |
| KR | 2003-0088420 A | 11/2003 |
| KR | 2004-20150 A | 3/2004 |

OTHER PUBLICATIONS

A methodology to enhance media policing over IMS Networks Sathyan, J.; Unni, N.; Wireless Pervasive Computing, 2007. ISWPC '07. 2nd International Symposium on Feb. 5-7, 2007 pp. 552-556.*
A DRM Architecture for Manageable P2P Based IPTV System Xiaoyun Liu; Tiejun Huang; Longshe Huo; Luntian Mou; Multimedia and Expo, 2007 IEEE International Conference on Jul. 2-5, 2007 pp. 899-902.*
Open DRM and the Future of Media Torres, V.; Serrao, C.; Dias, M.S.; Delgado, J.; Multimedia, IEEE vol. 15, Issue 2, Apr.-Jun. 2008 pp. 28-36.*

* cited by examiner

Primary Examiner—David Y Jung
(74) Attorney, Agent, or Firm—Sughrue Mion, PLLC

(57) ABSTRACT

A source device and a method are provided for certifying and controlling A/V signals output from an A/V device through an output terminal of a digital visual interface (DVI) or a high definition multimedia interface (HDMI), using Digital Rights Management (DRM). The source device includes: a DRM module which decrypts encrypted multimedia contents included in DRM contents through certification of a source device, and generates a control message for controlling digital A/V channels connected between the source device and a sink device based on a DRM rule; an input controller which certifies A/V data input from a media decrypter, and outputs A/V data filtered according to a certifying result; an input interface which converts the filtered A/V data into pixel data and audio data; and a signal transmitter which encrypts and converts the pixel and audio data into high-speed serial digital A/V signals to be transmitted to the sink device.

25 Claims, 12 Drawing Sheets

FIG. 6C

```
< DrmRules >
  < ManufacturerID = 'SAMSUNG' >
    < ProductID = 'PDP1004' >
      < Contraints >
        < ChannelR = "0" >
        < ChannelG = "0" >
        < ChannelB = "0" >
        < ChannelY = "0" >
        < ChannelCb = "0" >
        < ChannelCr = "0" >
        < ChannelAudio_01 = "0" >
        < ChannelAudio_02 = "0" >
        < ChannelAudio_03 = "0" >
        < ChannelAudio_04 = "0" >
        < ChannelAudio_05 = "0" >
        < ChannelAudio_06 = "0" >
        < ChannelAudio_07 = "0" >
        < ChannelAudio_08 = "0" >
        < GrayScale = "0" >
        < Noise = "0" >
      < / Contraints >
    < / ProductID >

< ProductID = 'LCD4078' >
      < Contraints >
        < ChannelR = "0" >
        < ChannelG = "0" >
        < ChannelB = "0" >
        < ChannelY = "0" >
        < ChannelCb = "0" >
        < ChannelCr = "0" >
        < ChannelAudio_01 = "1" >
        < ChannelAudio_02 = "1" >
        < ChannelAudio_03 = "1" >
        < ChannelAudio_04 = "1" >
        < ChannelAudio_05 = "1" >
        < ChannelAudio_06 = "1" >
        < ChannelAudio_07 = "1" >
        < ChannelAudio_08 = "1" >
        < GrayScale = "0" >
        < Noise = "0" >
      < / Contraints >
    < / ProductID >          (B) DRM RULE FOR OTHER
                                 PRODUCT OF SAMSUNG
    ...
  < / ManufacturerID >
                             (C) DRM RULE FOR
  < ManufacturerID = 'PHILIPS' >      PHILIPS
    ...
                             (D) DRM RULE FOR
  < / ManufacturerID >       OTHER MANUFACTURER
    ...
< / DrmRules >
```

SOURCE DEVICE AND METHOD FOR CONTROLLING OUTPUT TO SINK DEVICE ACCORDING TO EACH CONTENT

CROSS-REFERENCE TO RELATED APPLICATION

This application claims priority from Korean Patent Application No. 10-2004-0023774 filed on Apr. 7, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to digital rights management (DRM), and more particularly to certifying and controlling audio/video (A/V) signals which are output from an A/V device through an output terminal of a digital visual interface (DVI) or a high definition multimedia interface (HDMI), using DRM, wherein A/V signals are output according to a DRM rule of contents through certification of a relevant receiving device.

2. Description of the Prior Art

A conventional DRM technique encrypts contents so that only source devices having a license of the contents may play the contents. Another conventional DRM technique certifies and controls A/V signals transmitted/received between a source device and a sink device. Herein, the source device is a device for playing digital media and outputting A/V signals which are played, and the sink device is a device for simply receiving the A/V signals output from the source device and displaying the received A/V signals. For example, the source device may be a set-top box, a digital video disc (DVD) player, or a mainframe of a personal computer, and the sink device may be a digital television (TV), a liquid crystal display (LCD) monitor, or a plasma display panel (PDP) monitor.

Recently, studies have been actively progressing in regard to DRM, and commercial services employing DRM have been and continue to be introduced. The reason why DRM is utilized may be drawn from various characteristics which digital data have. Different from analog data, digital data have characteristics of being able to be copied without any loss, of being able to be reused and modified with ease, of being able to be easily distributed to a third person, and of permitting such copy and distribution to be performed easily at a very low cost. However, digital contents require a high cost, a great effort, and a long period of time to be manufactured. Therefore, if it is permitted to copy and distribute digital contents without permission, benefits of digital content manufacturers are infringed, thus depressing the creative will of digital content manufacturers and functioning as a large impeding factor in stimulating the digital content industry.

Efforts for protecting digital contents have been mostly concentrated on preventing a third person from accessing digital contents without permission. In other words, only some users having paid for digital contents are permitted to access the digital contents. Therefore, users which have paid can access digital contents which are not encrypted, but other users which have not paid cannot access such digital contents. However, if the users which have paid for access to the digital contents intentionally distribute the digital contents to a third person who has not paid for access to the digital contents, there is no way to prevent the third person from using the digital contents. In order to solve such a problem, DRM has been introduced. According to DRM, anyone may have access to encrypted digital contents without restriction, but a license for play is required in order to decrypt and play the encrypted digital contents. Therefore, when DRM is employed, it is possible to efficiently protect digital contents, in a way different from the prior art.

The concept of DRM will be described with reference to FIG. 1. DRM relates to how to handle contents (hereinafter, referred to as "encrypted contents") protected by encryption, scrambling, or the like, and licenses to permit access to the protected contents.

Referring to FIG. 1, a DRM system includes a user 4 wanting to access contents protected by DRM, a content provider 1 providing the contents, a license issuer 2 issuing a license which includes right capable of accessing the contents, and a certification authority 3 issuing a certificate.

According to the DRM system, the user (content playing device) 4 may obtain desired contents from the content provider 1, where the obtained contents are encrypted contents which are protected by the DRM. Also, the user 4 may obtain a license allowing play of the encrypted contents from the license issuer 2. The user 4 having obtained the license can play the encrypted contents. Meanwhile, the certification authority 3 issues a certificate, which proves the user 4 to be a certified user, to the content provider 1 and the user. A certificate may be stored in a device of the user 4 when the device is manufactured. Also, when an available period of time of a certification is expired, another certificate may be reissued from the certification authority 3.

Recently, in order to satisfactorily enjoy digital media when A/V data are transmitted from a digital-media playing device to a display device, a DVI or a HDMI method has been mainly used for digital A/V channels for connecting the devices to each other.

In 1998, the Digital Display Working Group (DDWG) was formed under the necessity of a standardized digital video interface between a PC and a VGA monitor. DVI 1.0 specification released in 1999 was designed to transfer uncompressed digital video, and to support PC graphics resolutions beyond 1600×1200 and high definition television (HDTV) resolutions.

In 2003, the electronics industry started to use a DVI output as video outputs of DVD playing devices and satellite set-top boxes, and using a DVI input as video inputs of digital TVs, LCD monitors, and PDP monitors. Also, the DVI supports the High-bandwidth Digital Content Protection (HDCP) standard for detecting unauthorized copying of contents, the Extended Display Identification Data (EDID) standard, and the Display Data Channel (DDC) standard used to read the EDID.

The DVI uses transition-minimized differential signaling (TMDS). Eight bits of video data are converted to a 10-bit transition-minimized DC value, which is then serialized. A receiver deserializes received video data, and converts it back to eight bits. Therefore, to transfer digital RGB data requires three TMDS signals, and these three TMDS channels and one TMDS clock channel may be comprised in one TMDS link.

Although the DVI handles the transmission of uncompressed digital RGB video, the electronics industry felt the necessity of a smaller and more flexible solution based on the DVI technology. In April 2002, the HDMI working group was organized by Hitachi Ltd., Matsushita Electric Industrial Co., Ltd., Philips Electronics, Sony Corporation, and Thomson Multimedia.

The HDMI has advantages, such as addition of digital audio and support of consumer electronics control (CEC), as compared with the DVI. In addition, the HDMI permits five video cables and eight audio cables or more to be replaced with a single cable. Currently, HDMI inputs are also applied on digital televisions, LCD monitors, and PDP monitors. Through the use of an adapter cable, the HDMI can be compatible with a device using DVI.

Since the HDMI is designed on the basis of the DVI, the HDMI supports the HDCP standard, the EDID standard, and the DDC standard, similarly to the DVI. From the viewpoint of a video format, the HDMI supports RGB, 4:4:4 YCbCr, and 4:2:2 YCbCr and also supports a transmission rate up to 24 bits per pixel. From the viewpoint of an audio format, the HDMI can transfers uncompressed stereo audio streams and compressed audio streams. Therefore, DVD-Audio can be transferred digitally to a receiver through a single cable. Herein, 'R', 'G', and 'B' represent a red signal, a green signal, and a blue signal, respectively. Also, 'Y', 'Cb', and 'Cr' represent a luminance (brightness) signal, a blue chroma signal, and a red chroma signal, respectively.

FIG. 2 is a block diagram for explaining a transmitting/receiving process of A/V signals between a source device and a sink device using the DVI or the HDMI. Each of TMDS channels CH 0 to CH 2 can process either each of R, G, and B data or each of Y, Cb, and Cr data. The synchronization of A/V data is performed between the source device and the sink device through a separate TMDS clock channel. Also, a DDC is separately included in order to transmit EDID of the sink device to the source device. In the case of the HDMI, eight audio channels are included besides the video channels.

The source device, based on the DVI or the HDMI, can understand various information, such as the manufacturer ID, the product ID, and the serial number of the sink device, by checking the EDID included in the sink device. Also, the source device checks a video format or an audio format capable of being received in the sink device, and transmits A/V signals according to the checked formats.

Meanwhile, the DVI and the HDMI support the HDCP standard. Therefore, the source device encrypts A/V signals to be output by means of an HDCP scrambler, and the sink device receives and decrypts the encrypted A/V signals by means of an HDCP descrambler. Accordingly, only sink devices equipped with an HDCP descrambler capable of decrypting in a method corresponding to an encrypting method of a scrambler in a source device can receive A/V signals output from the source device. A sink device including no descrambler cannot obtain desired video or audio data from the source device, because either the source device blocks the transmission of the A/V signal to the sink device, or the sink device cannot decrypt the encrypted A/V signals although the A/V signals are transmitted to the sink device.

That is, an HDCP module makes it possible to prevent copy of data and outflow of data to a third-party device (that is, an unauthorized device) by encrypting and decrypting A/V data to be transmitted from a source device to a sink device.

FIG. 3 is a block diagram showing constructions of a conventional source device and a conventional sink device, each of which includes an HDCP module. A source device 100 is connected to a sink device 200 through DVI cables or HDMI cables. In the case in which the devices are connected to each other through the DVI cables, Y, Cb, and Cr channels and audio channels must be omitted in FIG. 3.

According to the DVI and the HDMI standard, high-speed serial digital transmission can be performed between a graphic host and a digital display apparatus, that is, between the source device 100 and the sink device 200, respectively. The DVI standard includes rules of a coding mode of the source device 100, a decrypting mode of the sink device 200, a signal transmitter (Tx) 160, and the electrical property of a signal receiver (Rx) 210, etc., and these rules are utilized in the present invention. The DVI and the HDMI standard also includes a rule of a communication control mode, that is, a DDC, which enables it possible for the source device 100 to read control data according to EDID standard stored in the sink device 200.

The source device 100 includes a data receiving unit 110, a media decrypter 120, an input interface 130, an audio modulator 140, the signal transmitter 160, an HDCP scrambler 150. The sink device 200 includes the signal receiver 210, an HDCP descrambler 220, an audio demodulator 230, an output interface 240, an EDID memory 250, a video output unit 260, and an audio output unit 270.

Multimedia contents provided from a content provider are received through data receiving unit 110, are decrypted in the media decrypter 120, such as an MPEG decrypter, to be converted into A/V data. Then, the A/V data are input into the input interface 130, so as to be converted into pixel data capable of being displayed on an actual screen and audio data capable of being heard.

Next, the pixel data are input into the signal transmitter 160, and the audio data are input into the signal transmitter 160 via the audio modulator 140 which modulates a frequency of the A/V data so that the sink device 200 may receive the A/V data.

The signal transmitter 160 encrypts the pixel data and the modulated audio data by means of the HDCP scrambler 150 accommodated in the signal transmitter 160, and then transmits the encrypted data to the sink device 200 through the respective corresponding channels.

The signal receiver 210 of the sink device 200 receives encrypted A/V signals through corresponding channels, decrypts the encrypted A/V signals by means of the HDCP descrambler 220, and thus outputs actual pixel data and modulated audio data. The pixel data are input into the output interface 240. The modulated audio data are demodulated by the audio demodulator 230 so as to be recovered to audio data of an audio frequency band, and then are input into the output interface 240.

The pixel data and the audio data, which have been input into the output interface 240, are transferred into the video output unit 260 and the audio output unit 270, respectively, thereby being output as video and audio which a user may see and hear.

According to the conventional DRM technology described above, it is possible to analyze the DRM rule of multimedia contents to which the DRM standard is applied through the certification of a source device, and to control the source device itself with respect to the use of the contents. However, the conventional DRM technology does not provide any method of enabling a content provider to certify and control that a sink device receives an A/V signal transmitted from a source device having a legal right.

Also, according to the conventional DRM method, it is impossible to control that data are transmitted to a source device although the data are contents in which the DRM rule is applied, so that it is difficult to differentially control each of the sink devices, and it is impossible to prevent illegal copying of A/V data output through a sink device.

Also, according to the conventional certification and control techniques of A/V signals, certification and control can be carried out between a source device and a sink device, that is, between two devices. However, such certification and control is performed regardless of the kind of contents, so that the conventional techniques cannot provide a certification function according to contents, such as giving certification of permitting the display of multimedia to a sink device according to contents, or as restricting some functions of a sink device according to contents.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

It is an aspect of the present invention to provide a DRM technology capable of control video/audio channels while maintaining compatibility to the prior standards of the DVI and HDMI standards.

It is another aspect of the present invention to provide a method which makes it possible for a content provider to differentially control each of sink devices by employing the DRM technology.

In addition, still another aspect of the present invention is to provide a method which can flexibly control sink devices, for example, cut off transmission or transmit only a part of signals, by differentiating data transmissions from a source device to the sink devices according to the respective sink devices using the DVI and the HDMI.

According to an aspect of the present invention, there is provided a source device comprising: a DRM module for decrypting encrypted multimedia contents included in DRM contents through the certification of a source device, and generating a control message for controlling digital A/V channels connected between the source device and a sink device from a DRM rule; an input controller for performing a certification process with respect to A/V data input from a media decrypter, based on the control message and vendor information received from the sink device, and for outputting A/V data filtered according to the certifying result; an input interface for converting the filtered A/V data into pixel data and audio data; and a signal transmitter for encrypting the pixel data and the audio data, converting the encrypted data into high-speed serial digital A/V signals, and transmitting the high-speed serial digital A/V signals to the sink device through the digital A/V channels.

In accordance with another aspect of the present invention, there is provided a method for controlling an output to a sink device according to contents, the method comprising: (a) decrypting encrypted multimedia contents, which are included in DRM contents, after certification for a source device, and generating a control message for controlling digital A/V channels connected between the source device and a sink device from a DRM rule; (b) performing a certification process with respect to A/V data input from a media decrypter, based on the control message and vendor information received from the sink device, and outputting A/V data filtered according to the certifying result; (c) converting the filtered A/V data into pixel data and audio data; and (d) encrypting the pixel data and the audio data, converting the encrypted data into high-speed serial digital A/V signals, and transmitting the high-speed serial digital A/V signals to the sink device through the digital A/V channels.

The digital A/V channels may be realized by one method of a DVI method and a HDMI method.

The vendor information may be obtained from EDID (Extended Display Identification Data) of the sink device, and includes a manufacturer ID and a product ID.

The EDID may be obtained through a DDC which is connected between the source device and the sink device.

The input controller may comprise: a certification applying unit for analyzing the control message including the DRM rule, based on a manufacturer ID and a product ID of the sink device which are included in the vendor information, thereby deciding a constraint with respect to an output of the A/V data; and an A/V filtering unit for outputting filtered A/V data by partially or entirely cutting off the A/V data which are restricted according to the constraint.

The constraint may include one of restricting a part of channels or one of changing information to be transmitted.

The DRM contents may include the encrypted multimedia contents and the DRM rule.

The DRM contents may be constructed in a hierarchy structure, in which manufacturer IDs are first recorded, a plurality of product IDs are recorded according to the respective manufacturer IDs, and constraints are recorded according to the respective product IDs, wherein the constraints include information about channel control according to sink devices.

The DRM contents may be constructed in a hierarchy structure, in which manufacturer IDs are first recorded and constraints are recorded according to the respective manufacturer IDs, wherein the constraints include information about channel control according to sink devices.

The pixel data and the audio data may be encrypted by means of an HDCP scrambler.

The DRM contents may be transmitted from a DRM server through a network.

The DRM server may define information of usage constraints according to manufacturers or products of sink devices, as a DRM rule, encrypts multimedia contents, and binds the DRM rule and the encrypted multimedia contents with each other to generate the DRM contents.

The DRM server may comprise: a DRM rule generating unit for generating the DRM rule, based on policy of a content provider; a contents generating unit for generating multimedia contents from a multimedia source; and a DRM applying unit for encrypting the generated multimedia contents using a public key, and binding the encrypted multimedia contents and the generated DRM rule with each other to generate the DRM contents.

BRIEF DESCRIPTION OF THE DRAWINGS

The above and other aspects of the present invention will be more apparent from the following detailed description taken in conjunction with the accompanying drawings, in which:

FIG. 6C is a view showing a second example of a DRM rule;

DETAILED DESCRIPTION OF THE EXEMPLARY EMBODIMENTS

Figure 1:
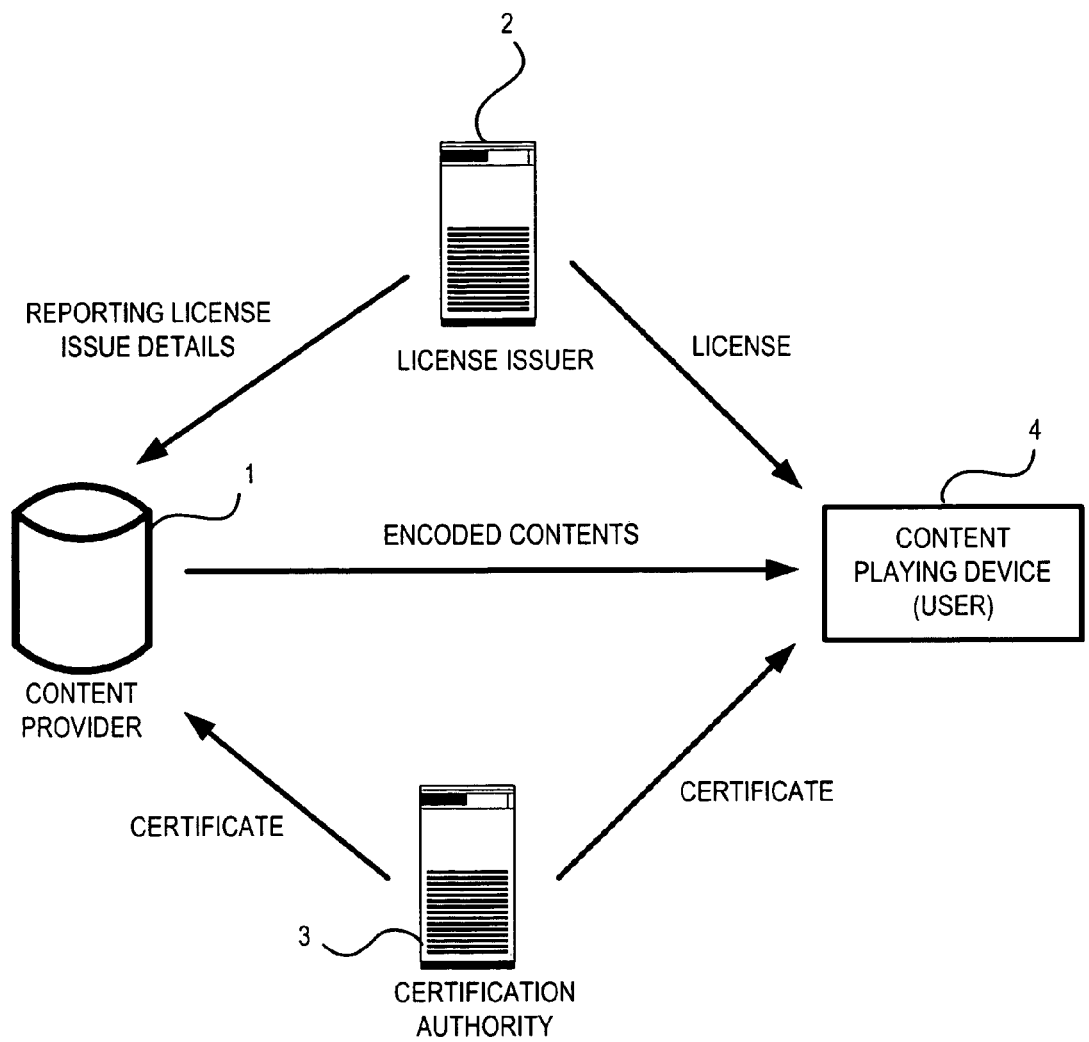
FIG. 1 is a schematic view showing a general construction of DRM.
Figure 2:
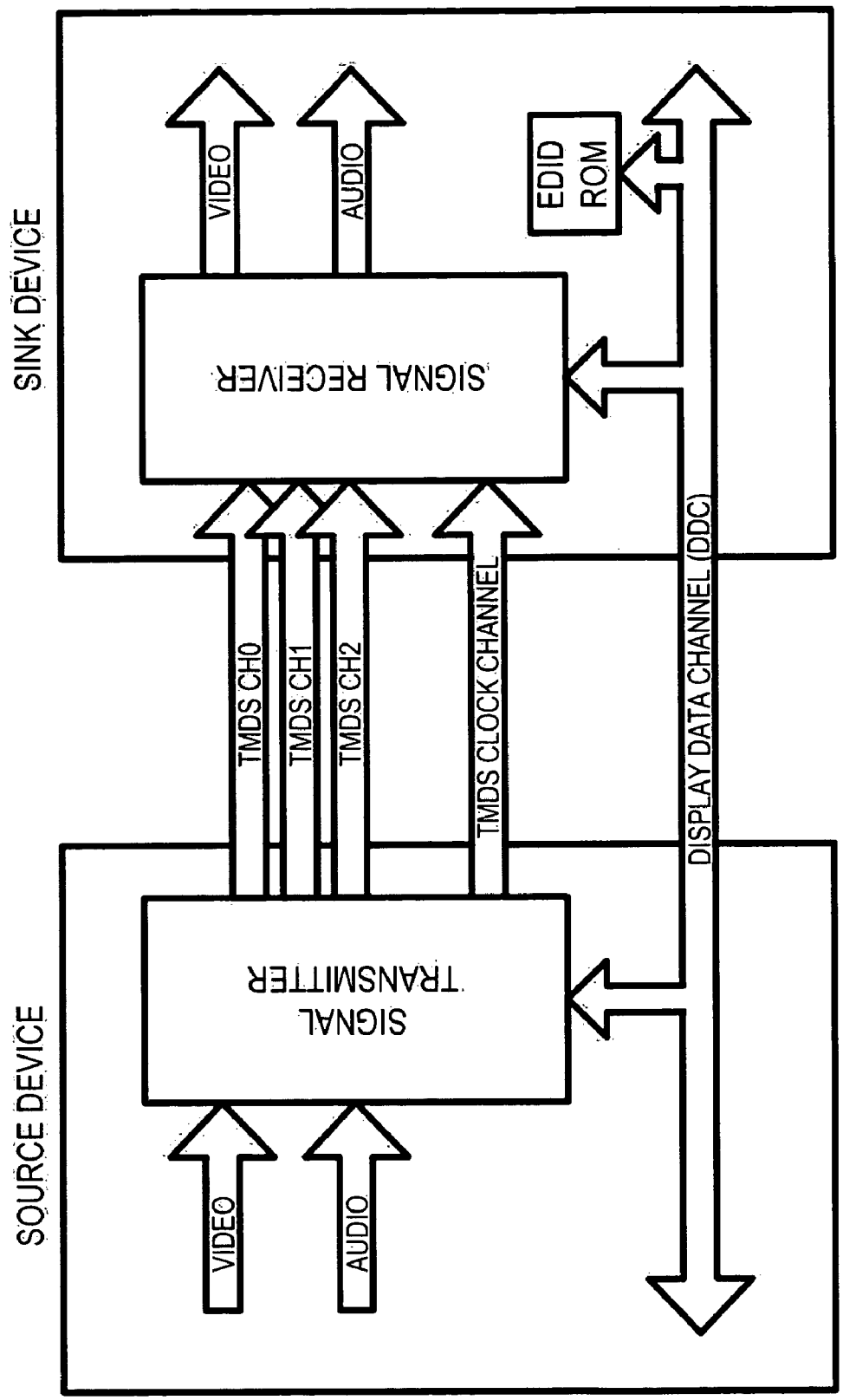
FIG. 2 is a block diagram for explaining a transmitting/receiving process of A/V signals between a source device and a sink device using the DVI or the HDMI.

Hereinafter, exemplary embodiments of the present invention will be described in detail with reference to the accompanying drawings. Advantages and features of the present invention, and methods for achieving them will be apparent to those skilled in the art from the detailed description of the exemplary embodiments together with the accompanying drawings. However, the scope of the present invention is not limited to the exemplary embodiments disclosed in the specification, and the present invention can be realized in various types. The described exemplary embodiments are presented only for completely disclosing the present invention and helping those skilled in the art to completely understand the scope of the present invention, and the present invention is defined only by the scope of the claims. Additionally, the same reference numerals are used to designate the same elements throughout the specification and drawings.

Figure 4:
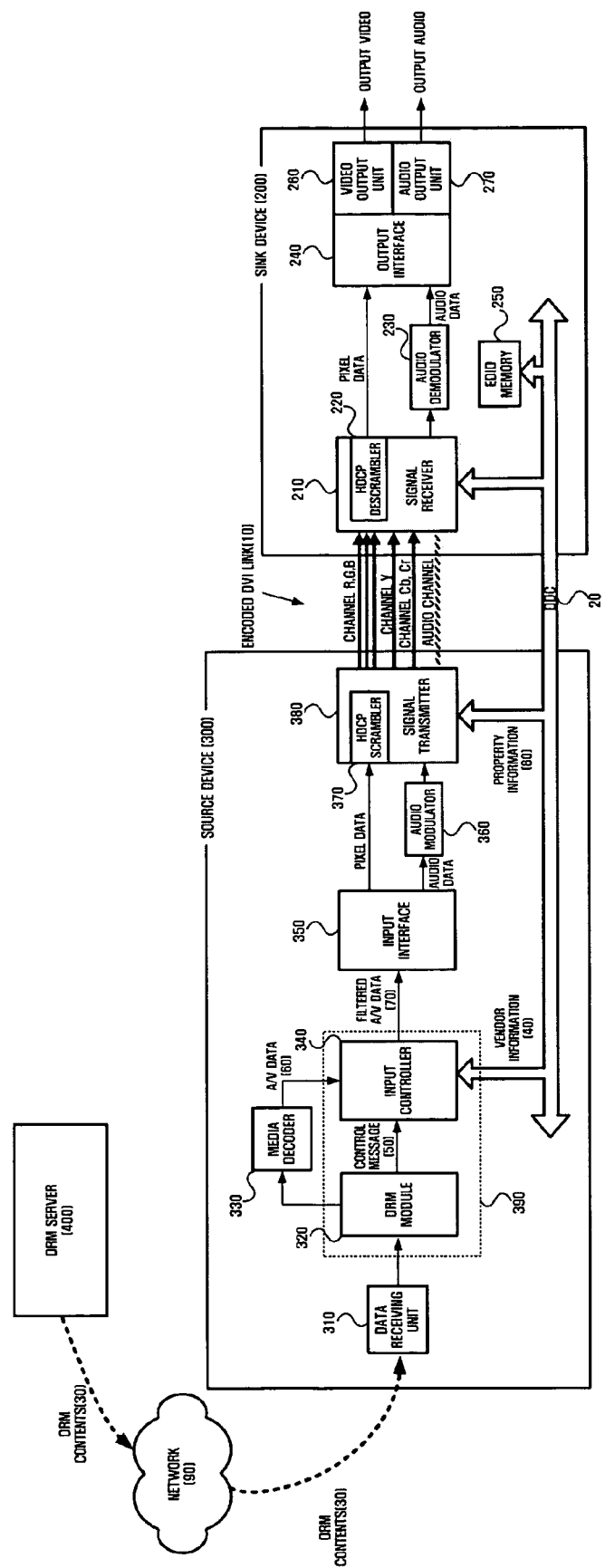
FIG. 4 is a block diagram showing a whole system according to an exemplary embodiment of the present invention.

FIG. 4 is a block diagram showing a whole system according to an exemplary embodiment of the present invention.

Figure 3:
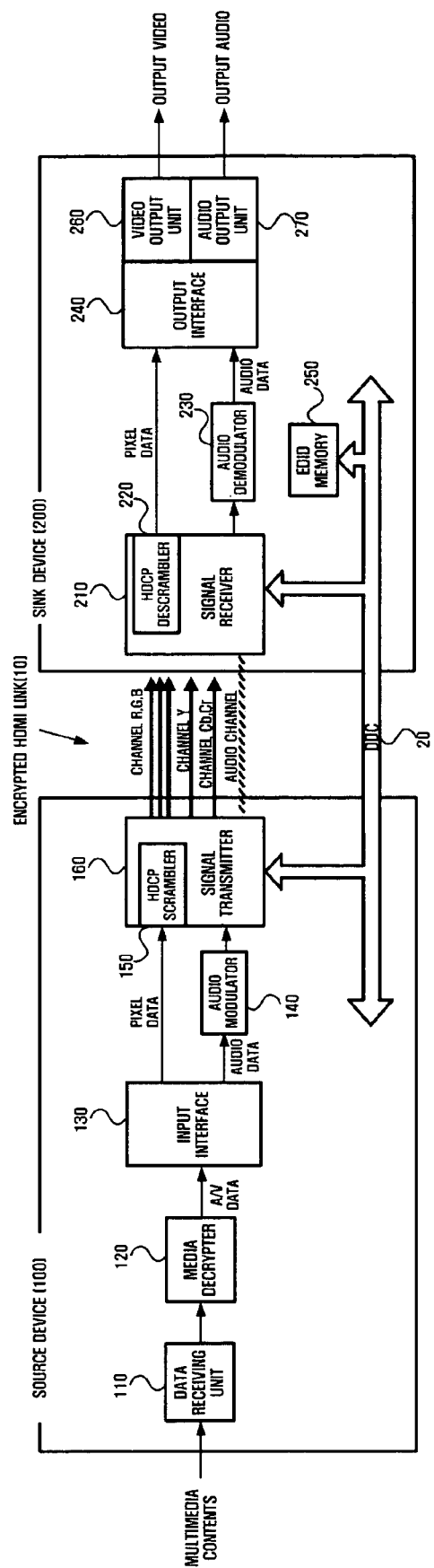
FIG. 3 is a block diagram showing constructions of a conventional source device and a conventional sink device, each of which includes an HDCP module.

A sink device 200 has an identical construction and performs an identical operation, to those of the sink device 200 shown in FIG. 3.

A source device 300 further comprises a DRM chip-set 390 including a DRM module 320 and an input controller 340, in addition to the construction of the source device 100 which is based on the DVI or the HDMI and shown in FIG. 3.

The source device 300 receives DRM contents 30, which are created in a DRM server 400 and transmitted through a network 90, and receives EDID from the sink device 200. Then, the source device 300 analyzes the received DRM contents 30 and the received EDID, thereby deciding kinds of signals to be transmitted to the sink device 200, and transmits the decided signals to the sink device 200. Herein, the source device 300 may obtain the DRM contents 30 not only from the DRM server 400 but also from another source device having downloaded the DRM contents 30 in advance.

Operations of the respective components in the source device 300 will be now described in detail.

The DRM contents 30 are encrypted contents including multimedia contents and a DRM rule used as meta-data. The DRM contents 30 are created by the DRM server 400 and are transmitted to the source device 300 through various network routes, for example, a TCP/IP network, IEEE 1394, etc. A process of creating the DRM contents 30 will be described later in detail with reference to FIG. 9.

Figure 5:
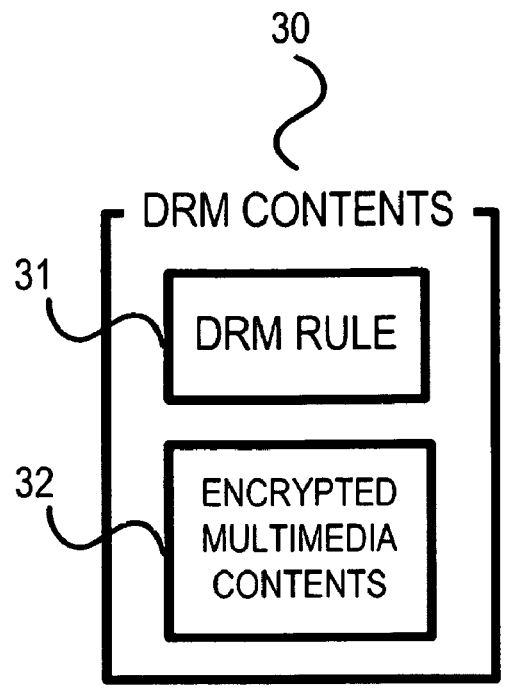
FIG. 5 is a block diagram showing a construction of DRM contents.
Figure 6A:
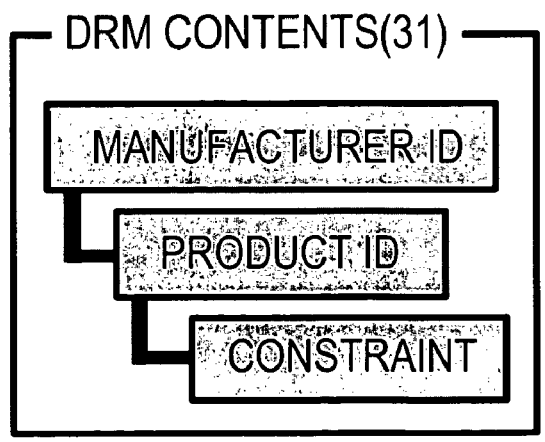
FIG. 6A is a block diagram showing an interior structure of a DRM rule.

A construction of the DRM contents 30 is shown in FIG. 5. The DRM contents 30 include a DRM rule 31 and encrypted multimedia contents 32. The DRM rule 31 is created by a DRM applying unit 420 included in the DRM server 400, and has a basic structure as shown in FIG. 6A.

The DRM rule 31 has a hierarchy structure, in which manufacturer IDs, various product IDs according to the manufacturer IDs, and constraints according to the product IDs may be recorded in sequence. Such constraints include channel control information according to sink devices.

Herein, it is not necessary that the constraints are recorded according to product IDs, and it is possible that the constraints are recorded according to manufacturer IDs, which means that an identical constraint is applied to all products manufactured by a corresponding manufacturer.

The DRM rule may adopt constraints according to types, such as a manufacturer, a manufacturing model, etc., of sink devices (display devices) as input factors. For example, the constraints may include 'transfer prohibition', 'change of transfer information', and 'control according to channels'. The 'transfer prohibition' means to transfer no data stream. The 'change of transfer information' means to distort data before transferring the data, that is, either to change color video data into black-and-white video before the transmission of the video data, or to add noise to audio data before the transmission of the audio data. The 'control according to channels' means to transfer only data streams of partial channels from among audio channels and video channels (R, G, B, Y, Cb, Cr).

Figure 6B:
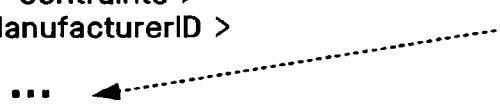
FIG. 6B is a view showing a first example of a DRM rule.

FIG. 6B is a view showing an example of the DRM rule. The hierarchy structure of the DRM rule 31 may be obtained by language that is hierarchically defined, such as Extensible Markup Language (XML). Referring to FIG. 6B, there are two manufacturer IDs of sink devices 200, that is, 'SAMSUNG' and 'SONY', and constraints are given according to manufacturers. In the constraints, '0' represents that a corresponding constraint is not applied, and '1' represents that a corresponding is applied.

For example, 'ChannelR=0' represents that it is permitted for the source device 300 to transfer an R channel signal of current contents to the sink device 200 of a corresponding manufacturer, and 'ChannelR=1' represents that it is not permitted for the source device 300 to transfer an R channel signal to the sink device 200 of a corresponding manufacturer. Also, 'GrayScale=1' represents that the output of a video signal is permitted but is restricted only to the output of a grayscale screen, and 'Noise=1' represents that an audio signal is output with noise mixed therewith. The video of a grayscale screen and the audio mixed with noise permit only an outline of the contents to be understood, but does not permit the contents to be entirely appreciated. Such a construction may be used for public information or for a demonstration.

Referring to FIG. 6B, all sink devices manufactured by 'SAMSUNG' are permitted to receive all A/V signals of current contents without any restriction. However, all sink devices manufactured by 'SONY' are permitted to receive RGB video signals of current contents, but are not permitted to receive YCbCr video signals. Also, a user of the sink devices manufactured by 'SONY' can hear sounds of only two channels, for example, a stereo sound, from among eight channels for audio signals, but cannot hear a 5.1 channel Dolby sound and DTS (Digital Theater Systems) sound.

Meanwhile, DRM rules of other manufactures may be additionally recorded on part 'A' of FIG. 6B.

FIG. 6C is a view showing another example of the DRM rule. That is, it is possible not only to give an identical constraint to all sink devices manufactured by a specific manufacturer as shown in FIG. 6B, but also to give different constraints to each of the sink devices of a specific manufacturer. Referring FIG. 6C, a PDP having a product number of 'PDP1004' has no constraint, but a LCD (Liquid Crystal Display) monitor having a product number of 'LCD4078' has a constraint that restricts the reception of an audio signal, although both are products manufactured by 'SAMSUNG'.

DRM rules of other products manufactured by 'SAMSUNG' may be additionally recorded on 'B' part of FIG. 6C. Also, DRM rules of products manufactured by 'PHILIPS' may be recorded on 'C' part of FIG. 6C, and DRM rules of products manufactured by other manufacturers may be additionally recorded on 'D' part of FIG. 6C.

Again referring to FIG. 4, a data receiving unit 310 receives DRM contents provided by a content provider via the network 90. The network 90 may be a TCP/IP network or an IEEE 1394 link. Also, the network 90 may be a wireless medium in the case in which the source device 300 is a set-top box. In addition, the network 90 may be an optical disk in the case in which the source device 300 is a DVD player. The data receiving unit 310 may be realized with an Ethernet adapter, a digital broadcasting reception tuner, or an optical-disk reading device, according to wireless media.

The DRM module 320 receives DRM contents 30 input through the data receiving unit 310, decrypts encrypted multimedia contents 32 included in the DRM contents 30 through the certification of the source device 300, and generates a control message 50 for a DVI channel control or an HDMI channel control, from the DRM rule 31. Such a control message 50 is binary data representing the DRM rule 31, which has been represented as meta-data, such as an XML (Extensible Markup Language), so as to be recognized in a microprocessor (not shown).

In order to decrypt encrypted contents, prior DRM techniques may be used. That is, it is possible to perform a decrypting process by means of a license issued received from a license issuer. The source device may receive a certificate, which represents the user of the source device to be a certified user, from a certification authority. Also, A certificate may be stored in a source device when the source device is manufactured. In addition, when an available period of time of a certificate is expired, another certificate may be reissued from a certification authority.

A media decrypter 330 decompresses multimedia contents, which have been decrypted in the DRM module 320, by a predetermined method, thereby generating A/V data 60. A specific construction of the media decrypter 330 is determined according to encrypting methods of the multimedia, in which the encrypting methods include MPEG1, MPEG2, MPEG4, H.261, H.263, MP3, and DTS.

The input controller 340 performs a certification process with respect to A/V data input from the media decrypter 330, based on the control message 50 generated from the DRM module 320 and vendor information 40 received from the sink device 200 through a DDC (Display Data Channel), and transfers A/V data 70, which are filtered according to a result of the certifying, to an input interface 350. Such filtered A/V data 70 may be identical to the A/V data 60 in the case of certification having no constraint, but may be A/V data having subjected to a transmission cut-off process, a changing process of transmission information, a filtering process according to channels, in a case of certification having at least one constraint.

Figure 7:
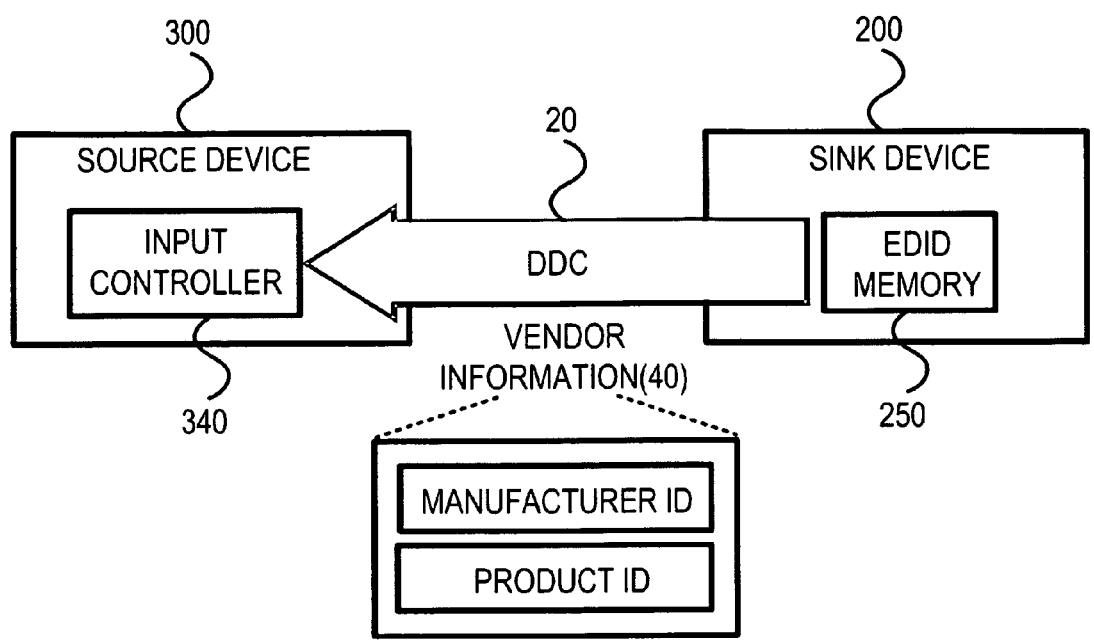
FIG. 7 is a block diagram showing details of vendor information.

FIG. 7 is a block diagram showing details of vendor information. Vendor information 40, which the input controller 340 has received from an EDID memory 250 of the sink device 200 through the DDC, includes a manufacturer ID and a product ID. The EDID standard secures compatibility between a display device, such as a digital display device, and a source device, such as a personal computer, a digital video player, or the like. The EDID includes not only the vendor information 40, such as the manufacturer ID and the product ID, but also property information 80 representing display properties of a digital display device.

Figure 8:
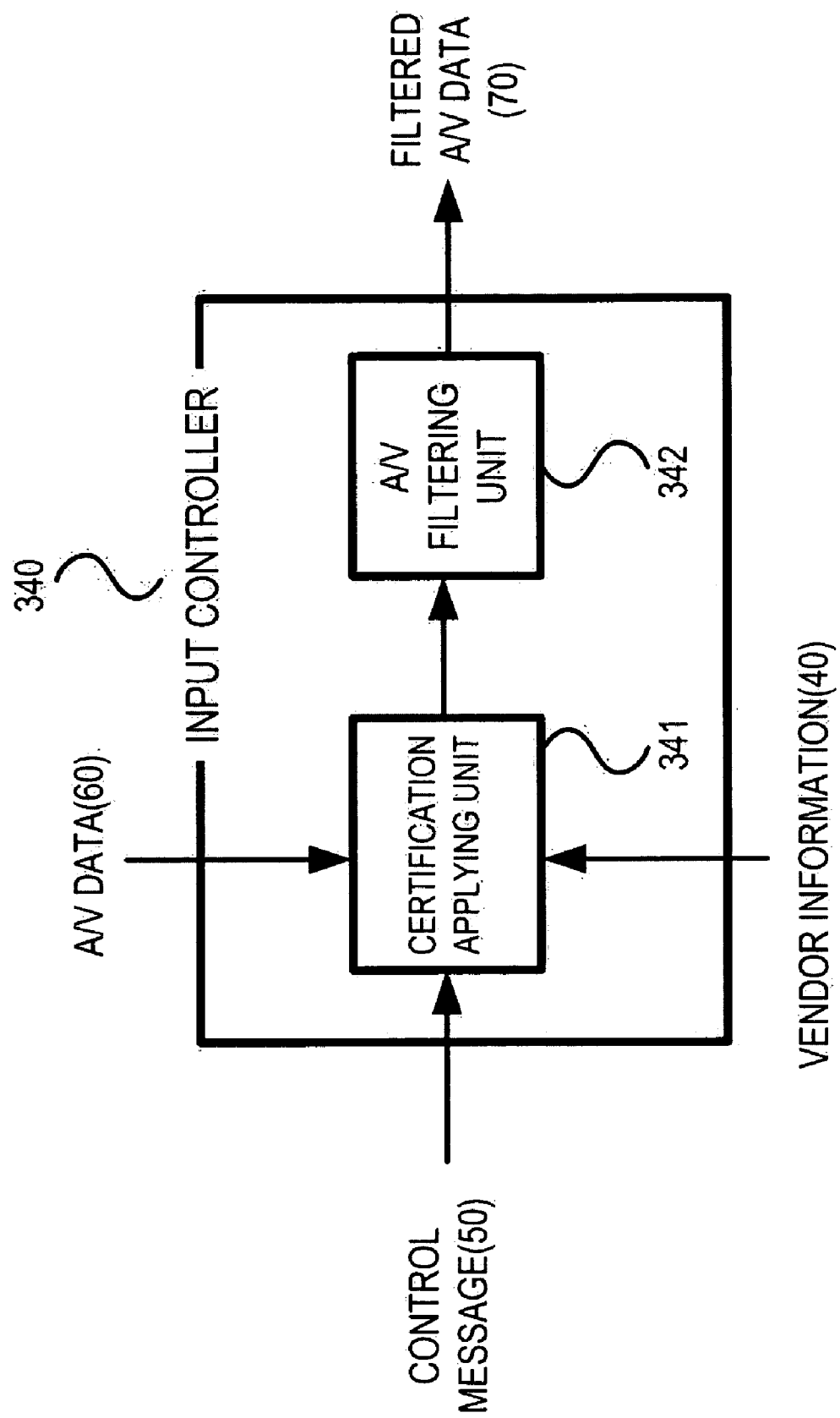
FIG. 8 is a block diagram showing a construction of an input controller.

FIG. 8 is a block diagram showing a construction of the input controller. The input controller 340 may include a certification applying unit 341 and an A/V filtering unit 342.

The certification applying unit 341 analyzes the control message 50 including DRM rules, based on a manufacturer ID and a product ID of a sink device included in the vendor information 40, and decides constraints of an output of the A/V data 60. Such constraints may include cut-off of some channels, entire cutout of transmission, and change of transmission information.

The A/V filtering unit 342 cuts off the transmission of either all or a port of the A/V data 60, which must be restricted according to constraints decided by the certification applying unit 341, thereby outputting filtered A/V data 70.

Again referring to FIG. 4, the input interface 350 receives the filtered A/V data 70, and converts the filtered A/V data 70 into pixel data capable of being displayed on an actual screen and audio data capable of being heard. The pixel data are directly input into a signal transmitter 380. The audio data passes through an audio modulator 360 so as to be modulated into a frequency suitable to the reception of the sink device 200, and then are input into the signal transmitter 380.

The signal transmitter 380 encrypts the pixel data and the modulated audio data by means of an HDCP (High-bandwidth Digital Content Protection) scrambler 370 included in the signal transmitter 380, converts the encrypted data into high-speed serial digital A/V signals, and transfers the converted A/V data to the sink device 200 through the respective corresponding channels. The HDCP standard provides for scrambling/descrambling processes and for the transmission of a shared key when a video signal is digitally transmitted between the source device 300 and the sink device 200. The DVI standard provides for a technique for encrypting and decrypting a video signal, and recommends the HDCP standard.

Data encrypted as described above are converted into A/V signals in consideration of property information stored in the EDID memory of the sink device. The property information is used for establishing a decrypting system in the source device. If source device obtains values of incorrect property information, the source device may malfunction.

The property information is read by means of a microprocessor (not shown) in the sink device 200. The signal transmitter 380 establishes specifications of a viewing angle (the number of horizontal pixels, the number of vertical lines, etc.) and a decrypting parameter of a video signal (a frame frequency, etc.), based on data included in the read property information.

To be more specific, the property information includes data for representing a type of a video signal and data for representing a type of an audio signal. The data for representing a type of a video signal include resolution, a video frames period, the number of pixels, the number of lines, and a type of a signal (RGB signals or luminance/color-difference signals). The data for representing a type of an audio signal include the number of sample bits of audio data, a sampling frequency, and the number of channels corresponding to the number of speakers.

The construction and the operation of the sink device 200 according to the exemplary embodiment of the present invention are identical to those of the sink device 200 shown in FIG. 3. Therefore, a signal receiver 210 of the sink device 200 receives encrypted A/V signals through corresponding channels, decrypts the encrypted A/V signals by means of an HDCP descrambler 220, and thus outputs actual pixel data and modulated audio data. The pixel data are input into an output interface 240. The modulated audio data are demodulated by an audio demodulator 230 so as to be recovered to audio data of an audio frequency band, and then are input into the output interface 240. The pixel data and the audio data, which have been input into the output interface 240, are transferred into a video output unit 260 and an audio output unit 270, respectively, thereby being output as video and audio which a user may see and hear.

Figure 9:
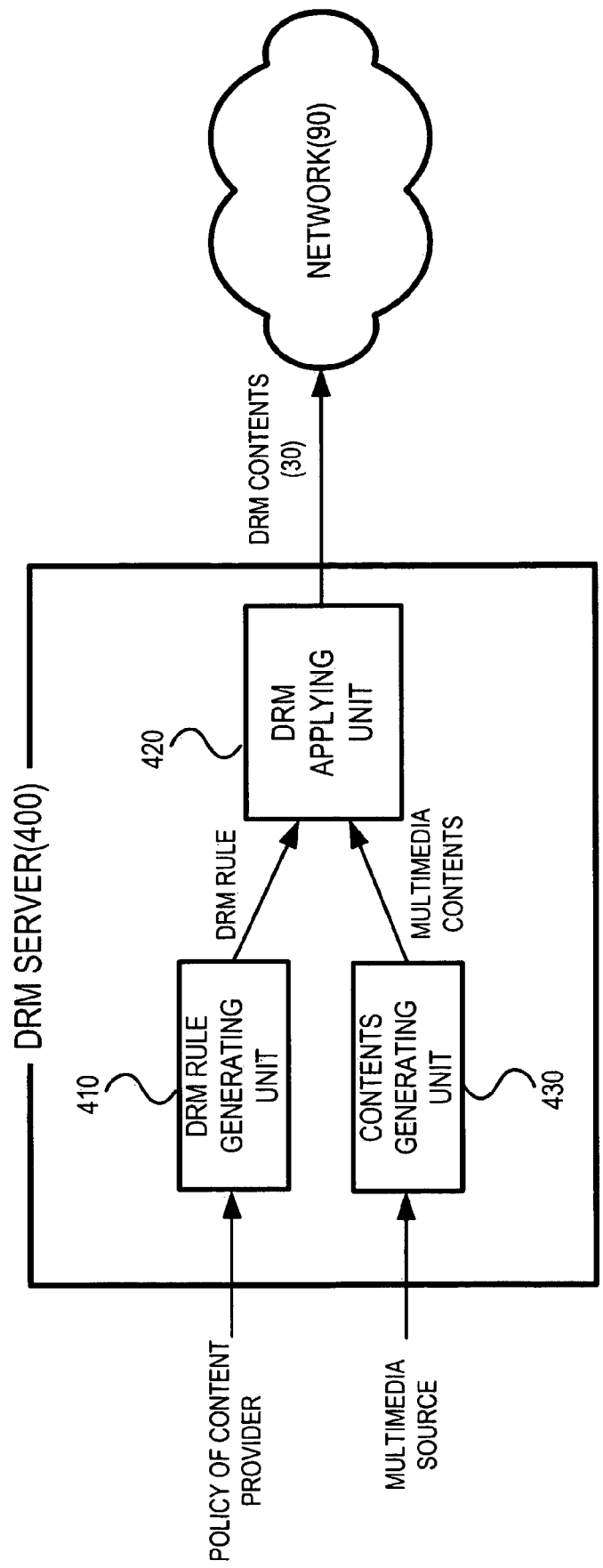
FIG. 9 is a block diagram showing a construction of a DRM server.

FIG. 9 is a block diagram showing a construction of a DRM server.

The DRM server 400 defines information of usage constraints according to manufacturers or according to products of sink devices as the DRM rules, encrypts multimedia contents, and binds the DRM rules and the encrypted multimedia contents with each other to generate DRM contents. The DRM server 400 includes a DRM rule generating unit 410 for generating a DRM rule 31 on the basis of the policy of a content provider, a contents generating unit 430 for generating multimedia contents from a multimedia source, and the DRM applying unit 420. The DRM applying unit 420 encrypts the generated multimedia contents using a public key, and binds the encrypted multimedia contents 32 and the generated DRM rule 31 with each other to generate DRM contents 30. As a method of encrypting the multimedia contents 32 using a public key, a prior art may be employed.

In FIGS. 4, 8 and 9, the respective components may be defined as modules, wherein the term "module" represents a software element or a hardware element, such as an FPGA or an ASIC, and the module performs a predetermined role. However, the module is not limited to software or hardware. Further, the module may be constructed to exist in an addressable storage module, or to play one or more processors. For instance, the module includes elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables. Herein, functions provided by modules may be provided by a smaller number of combined larger modules, or by a larger number of divided smaller modules. In addition, the modules may be realized to operate one or more computers in a communication system.

Figure 10:
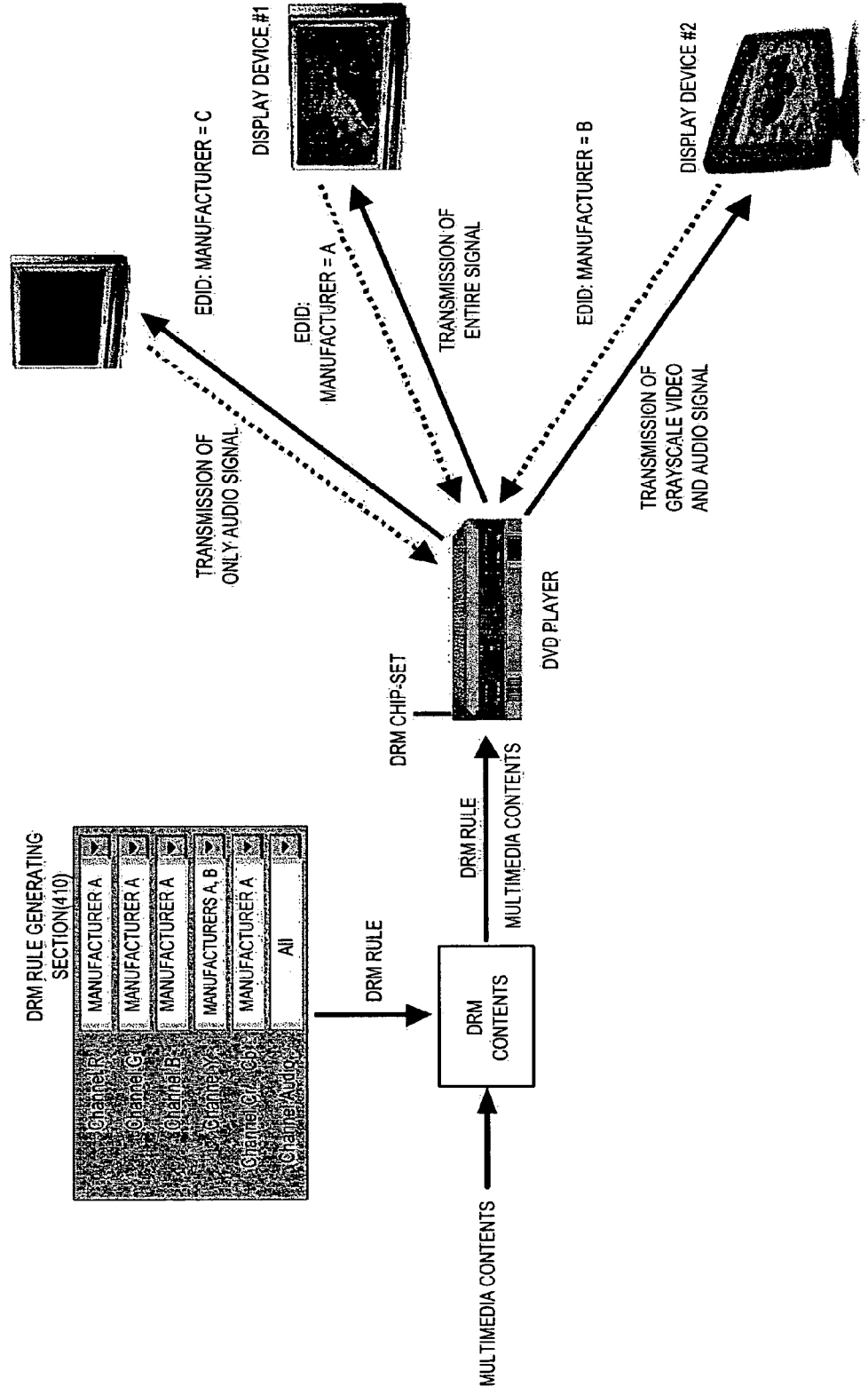
FIG. 10 is a schematic view for explaining the whole process of a system according to an exemplary embodiment of the present invention.

FIG. 10 is a schematic view for explaining the whole process of a system according to an exemplary embodiment of the present invention.

As shown in FIG. 10, the DRM rule generating unit 410 may assign constraints and authorities according to manufacturers with respect to each of channels. Manufacturer 'A' receives all authorities, and Manufacturer 'B' receives authorities of only a Y (brightness) channel and an audio channel. The authority of the audio channel is opened to all manufacturers.

When DRM contents binding such DRM rules and multimedia contents with each other are input into a DVD player, which is a source device and accommodates a DRM chip-set including a DRM module and an input controller, the DVD player transfers A/V signals, in which a specific signal is filtered according to the respective sink devices, that is, according to display devices. That is, the DVD player obtains information that display device #1 has been manufactured by Manufacturer 'A' from the EDID, and transfers all signals to the display device #1. Also, the DVD player transfers only grayscale video and audio signals to display device #2 which has been manufactured by Manufacturer 'B'. In addition, the DVD player transfers only audio signals to display device #3 which has been manufactured by Manufacturer 'C'.

As described above, although different constraints are applied to each of the sink devices, these rules are applied only with respect to specific contents currently being carried, and it is natural to apply other constraints to the respective sink devices with respect to other contents. Consequently, it is possible to flexibly control sink devices differently according to contents.

Figure 11:
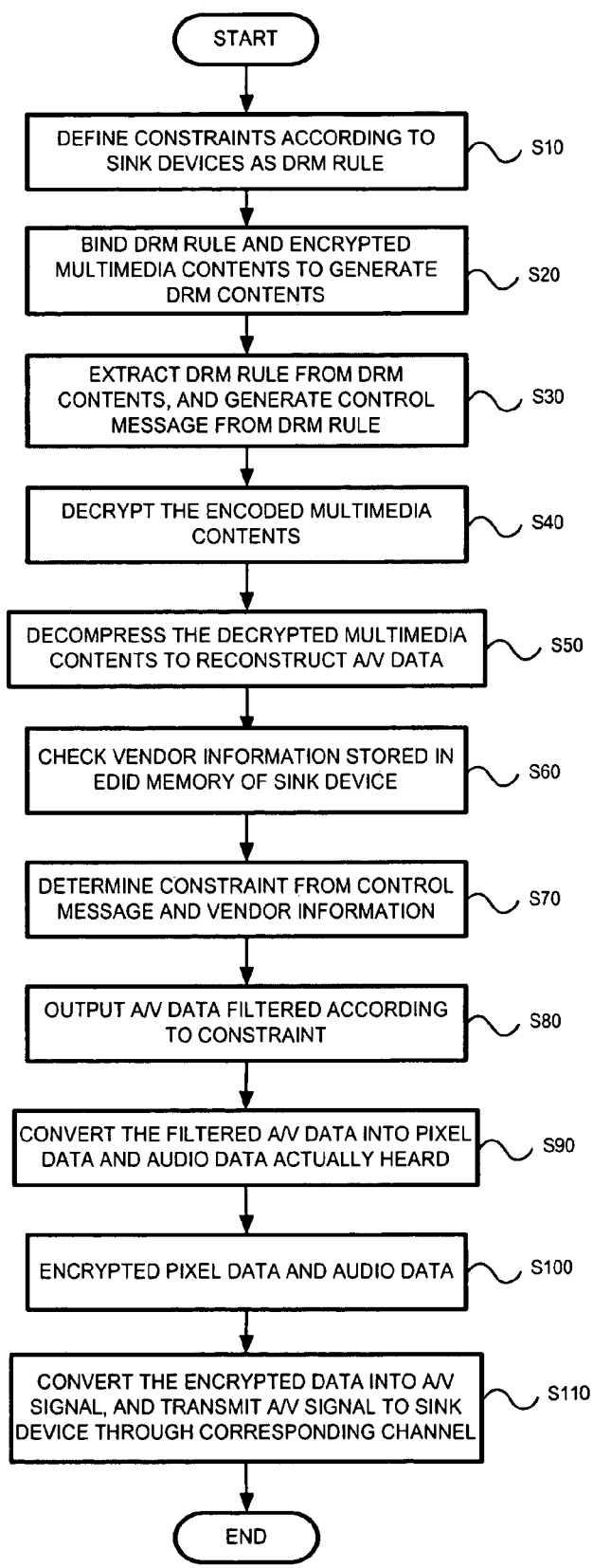
FIG. 11 is a flowchart for explaining the whole operation of a system according to an exemplary embodiment of the present invention.

FIG. 11 is a flowchart for explaining the whole operation of a system according to an exemplary embodiment of the present invention.

First, the DRM server 400 defines constraints according to sink devices as a DRM rule (operation 10), and bines the DRM rules with encrypted multimedia contents, thereby generating DRM contents 30 (operation 20).

The DRM module 320 of the source device 300 extracts the DRM rule 31 from the DRM contents 30 and generates a control message from the DRM rule (operation 30), and decrypts the encrypted multimedia contents (operation 40).

The media decrypter 330 decompresses the decrypted multimedia contents, thereby recovering A/V data (operation 50).

The input controller 340 checks vendor information, which is stored in the EDID memory of the sink device, through the DDC channel (operation 60), determines constraints according to the control message and the vendor information (operation 70), and transfers filtered A/V data (operation 80) by partially or entirely cutting off the A/V data which must be restricted according to the determined constraints.

The input interface 350 receives the filtered A/V data 70, and converts the filtered A/V data 70 into pixel data capable of being displayed on an actual screen and audio data capable of being heard (operation 90).

The signal transmitter 380 encrypts the pixel data and the audio data by means of an HDCP scrambler 370 accommodated in the signal transmitter 380 (operation 100), converts the encrypted data into high-speed serial digital A/V signals, and transfers the converted A/V data to the sink device 200 through the respective corresponding channels (operation 110).

According to the present invention, a DRM server can control an output method of video/audio data, through the certification of a sink device (display device) according to the policy of a content provider. That is, the permission and constraint of using contents are determined not in a designing operation of a sink device, but by the provider of the contents, so that it is possible to construct a dynamic control and management system.

In addition, according to the present invention, a source device checks whether or not a sink device is connected with a recoding device, and controls the transmission of video/audio data according to a result of the checking, so that it is possible to prevent contents from being copied illegally through connection to the sink device.

Although exemplary embodiments of the present invention have been described for illustrative purposes, those skilled in the art will appreciate that various modifications, additions and substitutions are possible, without departing from the scope and spirit of the invention as disclosed in the accompanying claims. Accordingly, the scope of the invention is not to be limited by the exemplary embodiments but by the claims and the equivalents thereof.

What is claimed is:

1. A source device comprising:
   a Digital Rights Management (DRM) module which decrypts encrypted multimedia contents included in DRM contents through certification of a source device, and generates a control message for controlling digital audio/video (A/V) channels connected between the source device and a sink device based on a DRM rule;

an input controller which certifies A/V data input from a media decrypter, based on the control message and vendor information received from the sink device, and outputs A/V data filtered according to a certifying result;

an input interface which converts the A/V data output by the input controller into pixel data and audio data; and a signal transmitter which encrypts the pixel data and the audio data, converting the pixel and audio data which are encrypted into high-speed serial digital A/V signals, and transmits the A/V signals to the sink device through the digital A/V channels.

2. The source device as claimed in claim 1, wherein the digital A/V channels are realized by a Digital Visual Interface (DVI) method.

3. The source device as claimed in claim 1, wherein the digital A/V channels are realized by a High Definition Multimedia Interface (HDMI) method.

4. The source device as claimed in claim 1, wherein the vendor information is obtained from Extended Display Identification Data (EDID) of the sink device, and includes a manufacturer ID and a product ID.

5. The source device as claimed in claim 4, wherein the EDID are obtained through a Display Data Channel (DDC) which is connected between the source device and the sink device.

6. The source device as claimed in claim 1, wherein the input controller comprises:

a certification applying unit which analyzes the control message including the DRM rule, based on a manufacturer ID and a product ID of the sink device which are included in the vendor information to determine a constraint with respect to an output of the A/V data; and an A/V filtering unit which outputs filtered A/V data by partially or entirely cutting off the A/V data which are restricted according to the constraint.

7. The source device as claimed in claim 6, wherein the constraint is to restrict a part of the digital A/V channels.

8. The source device as claimed in claim 6, wherein the constraint is to change information to be transmitted.

9. The source device as claimed in claim 1, wherein the DRM contents include the encrypted multimedia contents and the DRM rule.

10. The source device as claimed in claim 1, wherein the DRM contents are constructed in a hierarchy structure, in which manufacturer IDs are first recorded, a plurality of product IDs are recorded according to the respective manufacturer IDs and constraints are recorded according to the product IDs, and the constraints include information about channel control according to sink devices.

11. The source device as claimed in claim 1, wherein the DRM contents are constructed in a hierarchy structure, in which manufacturer IDs are first recorded and constraints are recorded according to the manufacturer IDs, and the constraints include information about channel control according to sink devices.

12. The source device as claimed in claim 1, wherein the pixel data and the audio data are encrypted by means of an High-bandwidth Digital Content Protection (HDCP) scrambler.

13. The source device as claimed in claim 1, wherein the DRM contents are transmitted from a DRM server through a network.

14. The source device as claimed in claim 13, wherein the DRM server defines information of usage constraints according to manufacturers or products of sink devices, as a DRM rule, encrypts multimedia contents, and binds the DRM rule and the encrypted multimedia contents with each other to generate the DRM contents.

15. The source device as claimed in claim 14, wherein the DRM server comprises:

a DRM rule generating unit which generates the DRM rule based on a policy of a content provider;

a contents generating unit which generates multimedia contents from a multimedia source; and a DRM applying unit which encrypts the generated multimedia contents using a public key, and binds the encrypted multimedia contents and the DRM rule with each other to generate the DRM contents.

16. A method for controlling an output to a sink device according to contents, the method comprising:

(a) decrypting encrypted multimedia contents, which are included in Digital Rights Management (DRM) contents through certification of a source device, and generating a control message for controlling digital audio/video (A/V) channels connected between the source device and a sink device based on a DRM rule;

(b) certifying A/V data input from a media decrypter, based on the control message and vendor information received from the sink device, and outputting A/V data filtered according to the certifying result;

(c) converting the A/V data which is output into pixel data and audio data; and (d) encrypting the pixel data and the audio data, converting the pixel and audio data which is encrypted into high-speed serial digital A/V signals, and transmitting the high-speed serial digital A/V signals to the sink device through the digital A/V channels.

17. The method as claimed in claim 16, wherein the digital A/V channels are realized by one method of a Digital Visual Interface (DVI) method and a High Definition Multimedia Interface (HDMI) method.

18. The method as claimed in claim 16, wherein the vendor information is obtained from Extended Display Identification Data (EDID) of the sink device, and includes a manufacturer ID and a product ID.

19. The method as claimed in claim 18, wherein the EDID are obtained through a Display Data Channel (DDC) which is connected between the source device and the sink device.

20. The method as claimed in claim 16, wherein step (b) comprises:

analyzing the control message including the DRM rule, based on a manufacturer ID and a product ID of the sink device which are included in the vendor information, to determine a constraint with respect to an output of the A/V data; and outputting filtered A/V data by partially or entirely cutting off the A/V data which are restricted according to the constraint.

21. The method as claimed in claim 20, wherein the constraint includes one of restricting a part of channels or changing information to be transmitted.

22. The method as claimed in claim 16, wherein the DRM contents are constructed in a hierarchy structure, in which manufacturer IDs are first recorded, a plurality of product IDs are recorded according to the respective manufacturer IDs and constraints are recorded according to the respective product IDs, and the constraints include information about channel control according to sink devices.

23. The method as claimed in claim 16, wherein the DRM contents are constructed in a hierarchy structure, in which manufacturer IDs are first recorded and constraints are recorded according to the respective manufacturer IDs, and the constraints include information about channel control according to sink devices.

24. The method as claimed in claim 16, further comprising, before step (a):
   (a1) defining information of usage constraints according to manufacturers or products of sink devices, as a DRM rule, encrypting multimedia contents, and binding the DRM rule and the multimedia contents which are encrypted with each other to generate the DRM contents; and
   (a2) providing the DRM contents to the source device.

25. The method as claimed in claim 24, wherein, step (a1) comprises:
   generating the DRM rule based on a policy of a content provider;
   generating multimedia contents from a multimedia source; and
   encrypting the multimedia contents using a public key, and binding the multimedia contents which are encrypted and the DRM rule with each other to generate the DRM contents.

\* \* \* \* \*